United States Patent [19]

Jenkins

[11] 4,262,050
[45] Apr. 14, 1981

[54] SKIN PACKAGING SUBSTRATE

[76] Inventor: Henry H. Jenkins, 864 W. Hacienda Dr., Corona, Calif. 91720

[21] Appl. No.: 938,886

[22] Filed: Sep. 1, 1978

[51] Int. Cl.³ .......................... B32B 3/10; B32B 3/28
[52] U.S. Cl. .................................. 428/138; 53/509; 206/497; 428/137; 428/182; 428/186
[58] Field of Search .............. 428/131, 137, 138, 186, 428/184, 182; 53/509, 510, 111; 206/471, 829, 497; 426/119, 124

[56] References Cited

U.S. PATENT DOCUMENTS

| 3,267,633 | 8/1966 | Goodman | 206/471 |
| 3,587,200 | 6/1971 | Stone et al. | 53/509 |
| 3,966,045 | 6/1976 | Perdue | 206/497 |

Primary Examiner—Paul J. Thibodeau

[57] ABSTRACT

A skin packaging substrate which includes a corrugated paper member made of a medium member sandwiched between first and second liner members is glued to a first chipboard member on one side thereof and is glued to a second chipboard member on the other side thereof. A plastic film is applied to the exposed surface of each of the chipboard members. Perforations are provided in each of the chipboard paper members which perforations extend into the interior of the corrugated paper member. An apparatus is disclosed for skin packaging products to both sides of the substrate.

2 Claims, 8 Drawing Figures

SKIN PACKAGING SUBSTRATE

The present invention relates to a new and improved skin packaging substrate and a skin packaging apparatus which is specially adapted for use in handling the skin packaging substrate in its ultimate use of skin packaging articles to the surface of the substrate.

The prior art includes skin packaging apparatus and substrates. However, in the case of substrates little attention has been given to the matter of strength and rigidity of the substrate per se because in most instances only light articles have been skin packaged to the substrates.

The present invention concerns itself with various aspects of skin packaging substrates and particularly to providing a skin packaging substrate which has a substantial strength and rigidity for skin packaging large and/or heavy articles thereto and also concerns itself with a structure where air may be removed through the perimeter or edges of the substrate or card.

The skin packaging substrate of the present invention also lends itself to the proposition that products may be skin packaged to both sides of the substrate with the resultant economics.

The present invention also relates to a skin packaging apparatus which enables the skin packaging substrate of the present invention to be utilized therewith to skin package a product to one side of the substrate after which the substrate may be turned over or reversed and a similar or completely dissimilar product may be skin packaged to the other side.

Other objects and a fuller understanding of this invention may be had by referring to the following description and claims, taken in conjunction with the accompanying drawings, in which:

Figure 1:
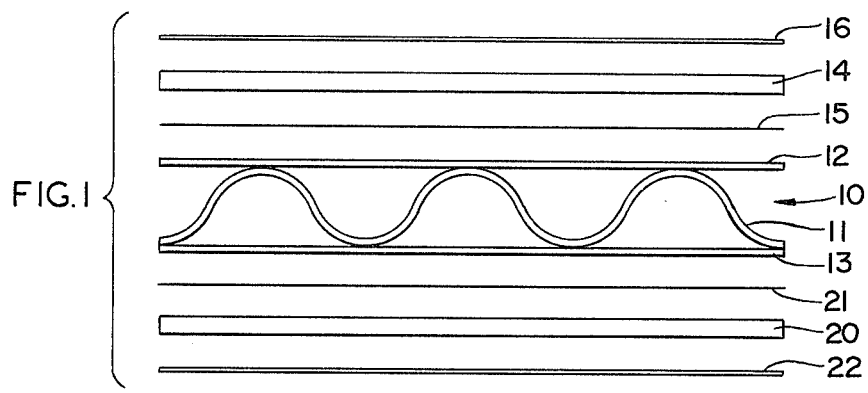
FIG. 1 is an exploded view showing the various components of one form of the substrate of the present invention.
Figure 2:
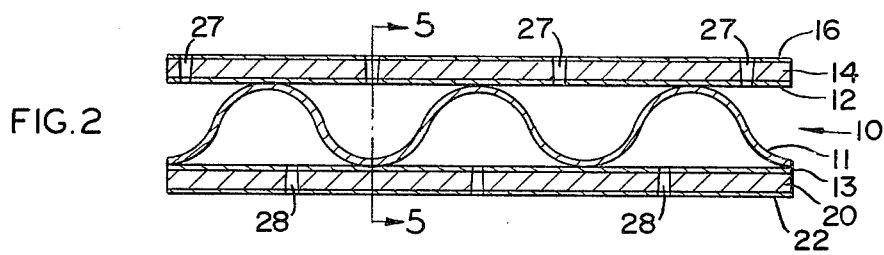
FIG. 2 is an enlarged fragmentary view in cross-section showing the substrate illustrated in FIG. 1 assembled and with air removal openings pierced therein.

The substrate of the present invention is well illustrated in FIGS. 1 and 2 of the drawings and has been indicated generally by the reference numeral 10. FIG. 1 illustrates the various layers of the substrate in exploded condition so that they can be better illustrated and understood by a reader of this specification. The substrate 10 includes a corrugated paper member which is comprised of a wavy shaped or sinusoidially extending or arranged medium member 11 sandwiched between first and second liner members 12 and 13 respectively. In the manufacture of the corrugated paper member the liner members are glued to the medium member at the places where the members contact each other so as to hold the corrugated paper member together as an integral unit. A first chipboard member 14 is provided and is adhered by a layer of glue 15 to the first liner member 12 and normally has a plastic film or coating 16 applied to the surface of the first chipboard member 14 on the side opposite the glue 15. While member 14 is relatively non-porous to passage of air the film 16 makes member 14 even more non-porous. Printing or other indicia may be applied to the outer surface of the first chipboard member 14 prior to laying down the plastic film or coating 16. This printing or indicia is designed to carry an advertising message or other instructions from the manufacturer of a product. The indicia is also designed to divide the surface of member 14 into the desired number of units or unit areas since it is conventional in the skin packaging art to package articles or products in multiples and then sever the multiples from each other in some sort of cutting mechanism such as a die cutting apparatus.

A second chipboard member 20 is integrally secured to the second liner member 13 by a layer of glue 21 in a manner identical to the securing of member 14 to the first liner member 12 and a plastic film or coating 22 is applied to the chipboard member 20 on a side opposite the glue 21. Coating 22 acts like coating 16. In like manner the exposed surface of chipboard member 20 may receive indicia before application of the coating 22.

FIG. 2 illustrates the various components assembled together as distinguished from their exploded condition as illustrated in FIG. 1; however, the glue layers of 15 and 21 illustrated in FIG. 1 have not been illustrated in FIG. 2 for more ease in clearly viewing and understanding the invention. All of the other layers that have been shown in FIG. 1 are shown in FIG. 2. In order to ready the substrate 10 for its ultimate use in skin packaging products to the surface thereof the perforations 27 are provided as illustrated in FIG. 2. These perforations 27 extend through the coating 16, the first chipboard member 14, first liner member 12 and into the passages formed by the medium member 11. If products are to be skin packaged only to the surface of member 14 it is only necessary that perforations 27 be provided because in the apparatus that will be illustrated herein in FIGS. 6, 7 and 8 it will be illustrated that air may be withdrawn by connecting a vacuum source to the edges or perimeter of the substrate 10 thereby withdrawing air through the passages defined by the sinusoidally extending medium member and through the perforations 27.

If it is desired to skin package products to both sides of the substrate 10 then perforations 28 are provided as illustrated in FIG. 2 which perforations extend through the second chipboard member 20 and obviously the plastic film 22 which is provided on the surface thereof and through the second liner member 13 into the passages defined by medium member 11, all in a manner similar to perforations 27 on the opposite side.

It is of course also possible to utilize the substrate 10 which is illustrated in FIG. 2 with perforations 27 and 28 even if one desires to skin package only on one side of the substrate; however, as pointed out immediately hereinabove it is not necessary that the perforations extend completely through the substrate 10 except in those instances where it is desired to skin package on both sides of the substrate.

The perforations 27 and 28 can be produced in the manner and by the apparatus described in the U.S. Pat. No. 3,760,671 issued Sept. 25, 1973.

Figure 3:
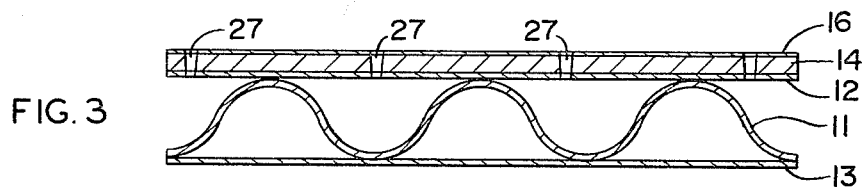
FIG. 3 is a view similar to FIG. 2 but showing a modification of the structure of the substrate of the present invention.

FIG. 3 illustrates a modification of the invention which is disclosed in FIGS. 1 and 2 and this modification will be apparent upon viewing the structure of FIG. 3. This variation of the invention illustrates the structure which results when the second chipboard member 20 is excluded from the structure of FIG. 2 which shows the second side of the substrate as terminating with the second liner member 13. In most corrugated paper members the structure of the liner members 12 and 13 is relatively porous as compared to the chipboard members 14 and 20 and as a result in most skin packaging machines which have a vacuum producing means the vacuum producing means in relation to the porosity of member 13 is such that air can be drawn directly through the liner member 13. In any event the structure of FIG. 3, whether member 13 is porous or not, is satisfactory for use in the apparatus to be described hereinafter in FIGS. 6-8 for skin packaging articles to the top surface thereof or in other words to the surface of the first chipboard member 14.

Figure 4:
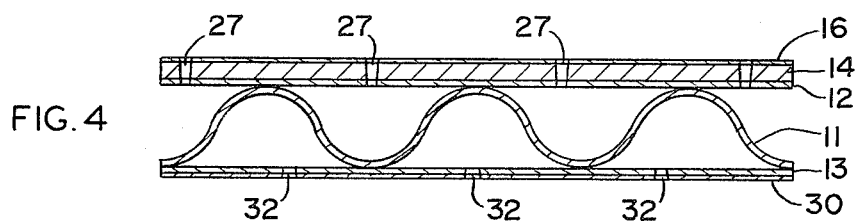
FIG. 4 is a view similar to FIGS. 2 and 3 but showing a still further modification of the substrate of the present invention.
Figure 5:
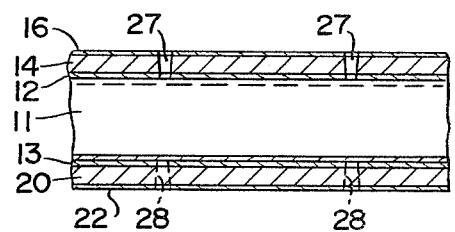
FIG. 5 is a view taken generally along the line 5—5 of FIG. 2.

FIG. 4 illustrates a still further variation of the invention over that described in FIGS. 2 and 3 and the structure of FIG. 4 is quite similar to FIG. 3 with the exception that a plastic film 30 is applied to the surface of the second liner member 13 and perforations 32 are provided which extend through the plastic film 30 and the liner member 13 into the passages formed by the sinusoidally extending medium member 11. With this structure products or articles of manufacture may not only be secured or skin packaged to the surface of chipboard member 14 but they may also be secured to the surface of the second liner member 13.

Figure 6:
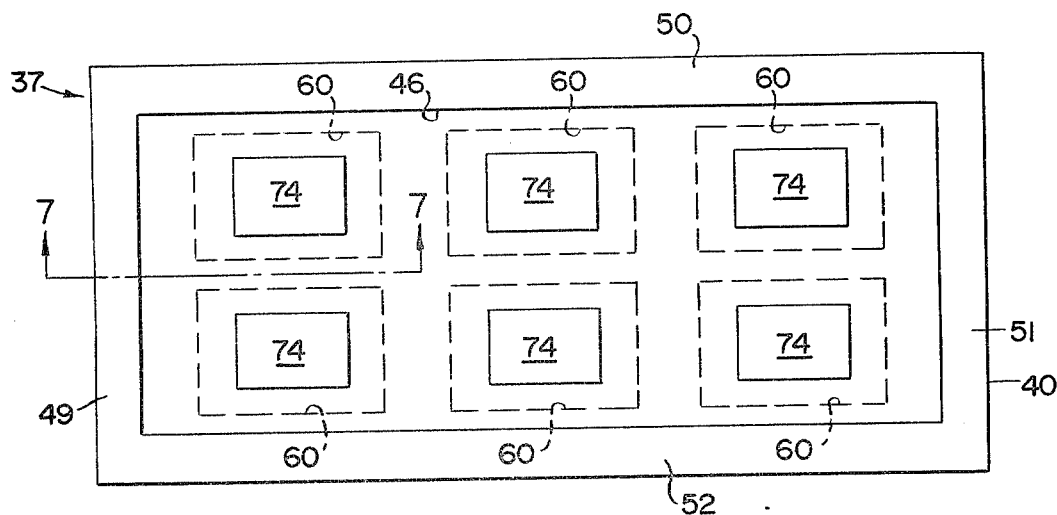
FIG. 6 is a plan view of the apparatus of the present invention illustrating a skin packaging substrate of the present invention in position on the apparatus.
Figure 7:
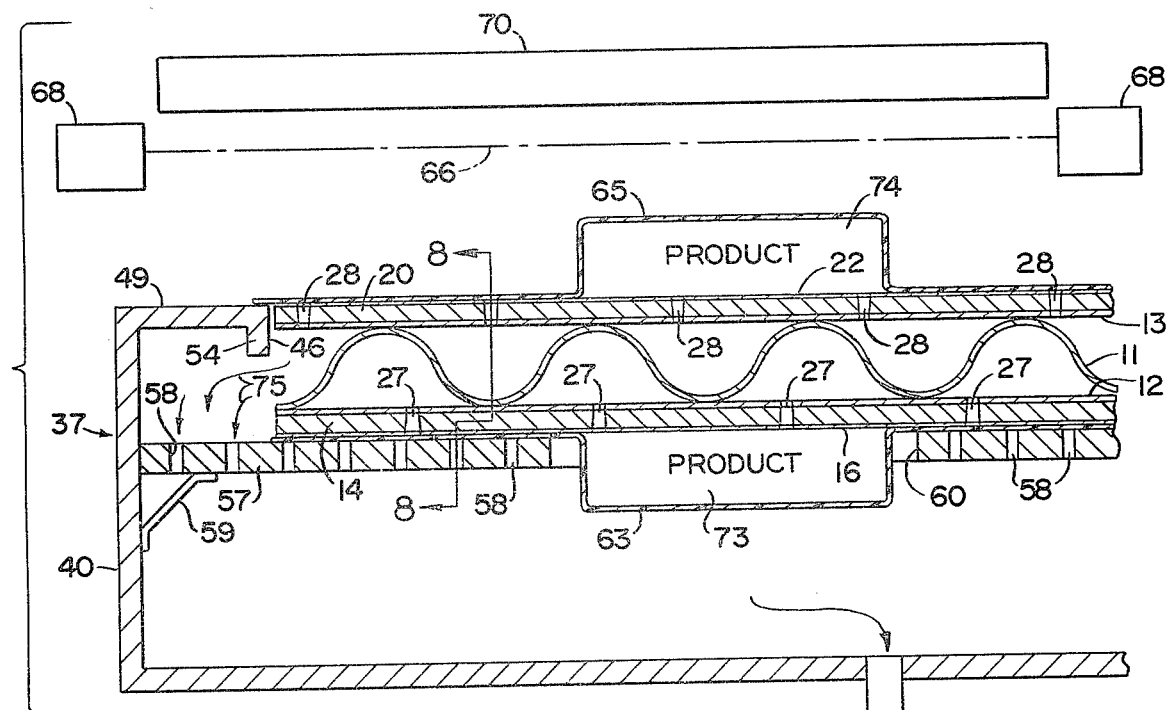
FIG. 7 is an enlarged fragmentary cross-sectional view taken generally along the line 7—7 of FIG. 6.
Figure 8:
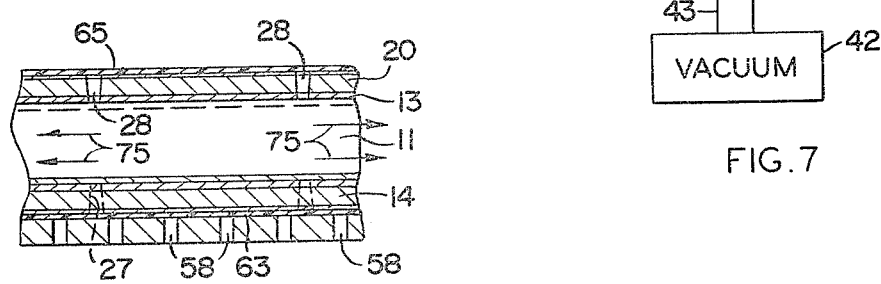
FIG. 8 is a view taken generally along the line 8—8 of FIG. 7.

FIGS. 6-8 illustrate the skin packaging apparatus of the present invention which has been illustrated generally by the reference numeral 37. The skin packaging apparatus 37 includes in combination a housing 40 which as illustrated in FIGS. 6 and 7 includes vertically extending walls which are formed in to flanges 49, 50, 51 and 52. These flanges 49-52 form what is referred to as wall means 46 which in effect define an opening in the upper portion of the apparatus 37. The flanges 49-52 terminate in what has been referred to as a lip 54. A vacuum source 42 is connected to the interior of the housing 40 by means of a conduit 43 and when actuated serves to produce a vacuum within the interior of the housing sufficient for performing a skin packaging operation which operation will be described in more detail hereinafter.

A support grid 57 is mounted within the interior of the housing and is held in position by means of brackets 59 in the manner illustrated in FIG. 7 and the support grid is provided with a multiplicity of air apertures 58. The support grid is also provided with what have been referred to as article receiving openings 60 which extend therethrough. A holding means 68 is illustrated schematically in FIG. 7 for the purpose of supporting a skin packaging film in the position illustrated by the dot-dash lines 66 and this holding means 68 is capable of moving the skin packaging film from the position 66 vertically downwardly into close proximity with the upper surface of the skin packaging apparatus in its operation. Positioned above 66 is a heater 70 which performs the function of heating the skin packaging film at the proper point in time in the skin packaging operation.

The skin packaging operation and use of the substrate illustrated in FIG. 2 of the drawings will be described in connection with FIG. 7. In this description it will be assumed that products 73 have already been skin packaged to the first chipboard member 14 by means of skin packaging film 63 and with this assumption in mind the substrate 10 is placed into the machine as illustrated in FIG. 7 with the plurality of products 73 extending through article receiving openings 60 in the support grid 57. The skin packaging film is brought into position 66 and products 74 are placed in the appropriate positions on the second chipboard member 20. The heater 70 is brought into position over the skin packaging film at position 66 to heat and soften the film to the desired degree after which the holding means 68 are actuated to bring the film downwardly into close proximity over the products 74 at which time the vacuum source 42 is actuated thereby drawing the film 65 tightly around the product 74 and into sealing contact with the plastic film or coating 22 which is applied to the outer surface of the second chipboard member 20 thereby tightly skin packaging the product to this surface. As illustrated in FIG. 7 the air is withdrawn from the surface between film 65 and film 22 through the perforations 28 and into the passages formed by the medium member 11 and thereafter out the perimeter or edges of the substrate 10 as illustrated by the arrows 75 in FIG. 7, down through the air apertures 58, through conduit 43 and into the vacuum producing means 42. This path of air flow is necessary because the skin packaging film 63 which was utilized to skin package product 73 to the surface of the chipboard paper member 14 prevents any air flow through perforations 27 and of necessity the air must flow as illustrated in FIG. 7.

It will be understood of course that in the skin packaging of products 73 to chipboard member 14 that air may not only flow in the direction just described but it may also flow through perforations 28 because they were not covered by the skin packaging film 65.

It will also be noted that the perimeter of the substrate 10 is of such a size that it is very closely adjacent the opening or wall means 46. This tolerance is such that there is not sufficient air flow through this space to at all interrupt the skin packaging process.

After the products 73 and 74 have been skin packaged to both sides of the substrate the substrate may be removed and the multiplicity of identically packaged articles may be separated in a die cutter or similar device.

It will be appreciated by those skilled in the art that the bonding of the chipboard member to the corrugated paper member as described and shown in conjunction with FIGS. 2, 3 and 4 not only provides and describes a structure upon which it is possible to skin package products on both sides but it also provides a structure which is sturdier and less capable of being broken or bent by rough handling by the ultimate consumer thereof. The bonding of the relatively dense chipboard member or members to the relatively porous corrugated paper member provides extreme resistance to bending or breaking of the substrate particularly in a direction which is at right angles to the direction of extent of the passages formed by the sinusoidally extending medium member. The materials of construction discussed and described in this application are described in connection with the meaning ordinarily imported to the various terms in the paper industry. The term chipboard is well understood by those skilled in the art and as a matter of specific example only and not in a limiting manner the thickness for example of the chipboard members 14 and 20 as disclosed in this application may be on the order of 0.026 inch and the overall thickness of the corrugated member may be on the order of from ⅛" to 3/16" in total thickness. It is conventional in the air to make the substrates used in conventional skin packaging operations of a surface area of for example 18"×24" as well as some slightly larger sizes. The glue identified by reference numerals 15 and 21 in FIG. 1 of the drawings may be any conventional glue satisfactory for the purpose of adhering the chipboard members to the liner members of the corrugated paper. The coatings 16 and 22 as well as coating 30 is any synthetic resinous material sometimes referred to as a plastic film which is compatible with the skin packaging films 63 and 65 which are to be adhered thereto. These synthetic resinous materials come a wide variety of well recognized chemical materials and the for sake of example only may be vinyls, acetates, polyethylenes and polypropylenes. These synthetic materials may also be aqueous dispersions of ionomer resins sold by Du Pont under the trademark "SURLYN". These films for use in coatings 16 and 22 are very thin and are measured in terms of pounds of solids per 1000 square feet. As a matter of example only the pounds of solids normally ranges from one to three pounds. The skin packaging films used in films 63 and 65 must be chemically compatible with the material used in coatings 16 and 22 and normally are made of the same generic materials. The thickness of films 63 and 65 may range from 0.003" to 0.010".

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A substrate for use in skin packaging including a corrugated paper member comprising a generally sinusoidally extending medium member sandwiched between first and second liner members, a first chipboard member adhered to said first liner member on a first side of said first chipboard member, a plastic film on a second side of said first chipboard member, a first plurality of perforations extending through said plastic film and said first chipboard member and through said first liner member and into said medium member, a second chipboard member adhered to said second liner member on a first side of said second chipboard member, a plastic film on a second side of said second chipboard member, and a second plurality of perforations extending through said last mentioned plastic film and said second chipboard member and through said second liner member and into said medium member.

2. A substrate for use in skin packaging including a corrugated paper member comprising a generally sinusoidally extending medium member sandwiched between first and second liner members, a first chipboard member adhered to said first liner member on a first side of said first chipboard member, a plastic film on a second side of said first chipboard member, a first plurality of perforations extending through said plastic film and said first chipboard member and through said first liner member and into said medium member, a plastic film on the outer surface of said second liner member and a second plurality of perforations extending through said last mentioned plastic film and said second liner member and into said medium member.

* * * * *